No. 771,123. PATENTED SEPT. 27, 1904.
W. BYRD.
TUBE WELDING MACHINE.
APPLICATION FILED APR. 18, 1903.
NO MODEL. 2 SHEETS—SHEET 2.
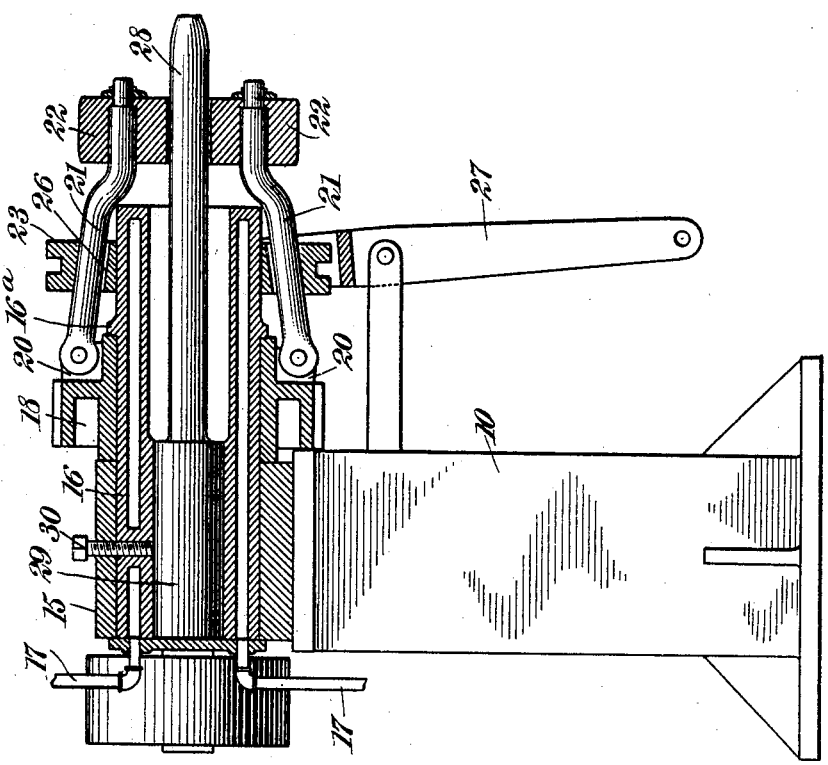
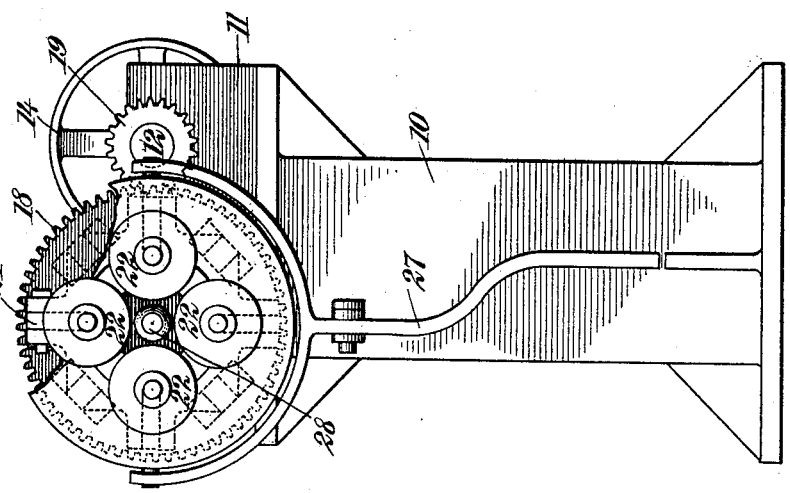
WITNESSES:
Robert Head
Isaac B. Owens.
INVENTOR
Walter Byrd
BY Munn & Co.
ATTORNEYS.

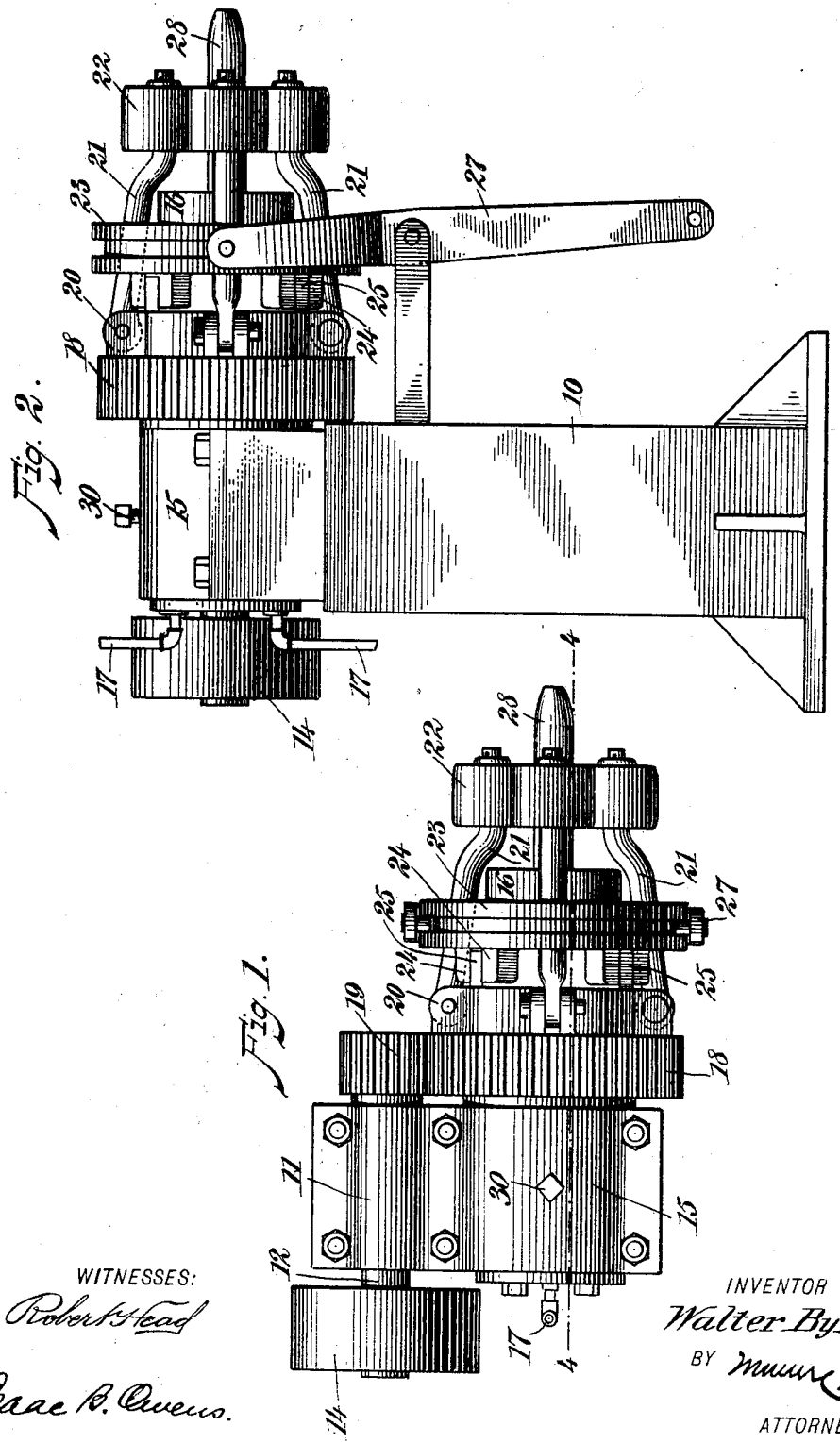

No. 771,123.

Patented September 27, 1904.

UNITED STATES PATENT OFFICE.

WALTER BYRD, OF WINNIPEG, CANADA.

TUBE-WELDING MACHINE.

SPECIFICATION forming part of Letters Patent No. 771,123, dated September 27, 1904.

Application filed April 18, 1903. Serial No. 153,220. (No model.)

*To all whom it may concern:*

Be it known that I, WALTER BYRD, a subject of the King of Great Britain, and a resident of Winnipeg, in the Province of Manitoba and Dominion of Canada, have invented a new and Improved Tube-Welding Machine, of which the following is a full, clear, and exact description.

This invention relates to a machine which upon changing the tools thereof may be employed either for cutting tubing or for welding together two sections of the same. It belongs to that general class in which the tube to be welded is placed over a mandrel and welding-tools are driven around the outer surface of the tube at the point of the weld.

The invention resides in certain special features of constructson and arrangement by which I am enabled to produce an apparatus more simple and effective than those of this class heretofore employed.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a side elevation thereof. Fig. 3 is a front end elevation with parts broken away, and Fig. 4 is a longitudinal section on the line 4 4 in Fig. 1.

The apparatus is mounted on a suitable stand 10, having at its upper portion a box 11, carrying the drive-shaft 12, to which power may be communicated by any desired means—for example, by a belt running over the pulley 14. The upper portion of the frame or support 10 is provided with a second box 15, to which is securely fastened a hollow water-jacketed shaft 16, said shaft being closed at its rear left-hand, Fig. 4, end and open at its front end. Circulating-tubes 17 lead to and from the jacket of the hollow shaft 16, so that if the exigencies of the operation require water may be circulated through the jacket of the hollow shaft to keep the parts from becoming unduly heated. Mounted on the shaft 16, between the box 15 and an annular rib 16ª, formed on the exterior of the shaft, is a spur-gear 18, which is in mesh with and driven from a pinion-gear on the shaft 12. This gear 18 is formed with lugs 20, and to said lugs are hinged the forwardly-extending arms 21, carrying when the machine is used as a welder welding-rollers 22, these rollers being one for each arm and being loose thereon. When the machine is to be used as a tube-cutter, the plane-faced rollers 22 should be replaced by rollers provided with annular knives having one side beveled, so that said knives in cutting through the tube will leave a conical-shaped end. By this arrangement no further scarfing is required. The arms 21 are mounted to swing toward and from the center of the shaft 16, so as to move into and out of active position, and this is effected by means of a collar 23, arranged to slide axially on the hollow shaft 16 and having, as best shown in Figs. 1 and 2, pairs of lugs 24, which straddle corresponding lugs 25, which project from the hub of the gear 18. This arrangement allows the collar 23 free axial movement on the shaft 16, but causes it to turn with the gear 18 and arms 21. Said collar 23 has openings 26 therein, these openings ranging diagonally with respect to the axis of the shaft 16 and having the arms 21 passed therethrough. Therefore upon shifting the collar 23 said arms 21 may be swung in or out, and thus the tools 22 moved into active or inactive position. The collar 23 may be operated by any desired means—for example, by the forked lever 27 illustrated in the drawings. The mandrel 28 is located in the axial center of the shaft 16 and has at its inner end an enlargement 29, fitting snugly within the interior diameter of the shaft 16 and held rigidly in place by means of a set-screw 30 or the like. The apparatus may be driven by any suitable power, and, if desired, the lever 27 may also be power-actuated.

In the operation of the machine, supposing it be desired to cut off a section of tubing, the proper cutting-tools are mounted on the arms 21 in place of the welding-rollers 22. The arms 21 should first be moved out to allow the insertion of the tube, and then the arms should be forced tightly toward the mandrel, causing the cutting-tools forcibly to engage the other surface of the tube. The gear 18 and its connected parts should then be set to revolution, whereupon the rotary cutters on the arms 21 will sever the tube. If the machine is to be used for welding, the two sections of the tube after having been temporarily joined together should be heated and then placed over the mandrel in such position that the joint or point to be welded lies directly within the rollers, after which the rollers should be tightened down on the heated pipe and the movement of the gear 18 started.

The construction provided insures a uniform and effective welding and prevents unevenness at the joint, which is a great disadvantage in welding-machines ordinarily employed. Many other advantages of the apparatus will be apparent to persons skilled in this class of machines.

Various changes in the form, proportions, and minor details of the invention may be resorted to at will without departing from the spirit and scope thereof. Hence I consider myself entitled to all such variations as may lie within the intent of my claims.

Having thus described my invention, I claim as new and desire to secure by Letters Patent—

1. The combination with a support, of a tubular shaft carried rigidly thereby, a mandrel mounted in the shaft and spaced therefrom, said mandrel being projected beyond one end of the tubular shaft, a rotary driving member turning around the tubular shaft, an arm having one end pivoted to the driving member the arm projecting beyond the said end of the tubular shaft, a tool carried by the free end of the arm and adapted to coact with the projected end of the mandrel, a collar mounted to slide and to turn on the said tubular shaft and engaged with the outer and inner sides of the arm at a point intermediate the ends thereof, whereby a movement of the collar toward and from the driving member will move the arm and its tool into and out of active position, and means for sliding the collar on the tubular shaft.

2. The combination with a support, of a tubular shaft fastened rigidly therein, a mandrel fastened in the shaft and spaced therefrom, said mandrel being projected beyond one end of the tubular shaft, a rotary driving member turning around the tubular shaft, an arm pivoted to the driving member, a tool carried by said arm and lying opposite the projected portion of the mandrel, and a collar slidable on the tubular shaft and engaging the arm whereby to move the tool into and out of active position, said driving member and collar having interengaged lugs imparting a rotary movement to the collar from the driving member and allowing independent sliding movement of the collar.

3. The combination of a support, a tubular shaft carried rigidly thereby, a mandrel mounted in the shaft and spaced therefrom, said mandrel being projected beyond one end of the tubular shaft, a rotary driving member turning around the shaft, an arm having one end pivoted to the driving member, the arm being projected beyond the said end of the tubular shaft, a tool carried by the free end of the arm and adapted to coact with the projected end of the mandrel, a collar mounted to slide and to turn on the tubular shaft and having an opening through which the arm is loosely passed, said collar engaging the arm at a point intermediate the ends thereof, for the purpose specified, and means for sliding the collar on the shaft.

4. The combination of a support, a tubular shaft carried thereby, a stationary mandrel mounted in the shaft and spaced therefrom, one end of the mandrel being projected beyond the shaft, a rotary driving member turning around the shaft, an arm having one end pivoted to the driving member to swing toward and from the mandrel, the other end of the arm projecting beyond the tubular shaft opposite the said projected end of the mandrel, a tool carried by said projected end of the arm, and means acting on the arm between the tool and rotary driving member for moving the arm toward and from the mandrel.

In testimony whereof I have signed my name to this specification in the presence of two subscribing witnesses.

WALTER BYRD.

Witnesses:
JOHN A. MacMAY,
R. H. SHANKS.